Oct. 6, 1925.  
C. P. BUCK  
1,556,072

AUTOMATIC VACUUM CONTROL APPARATUS

Filed July 18, 1921

Witness:  
R. E. Hamilton

Inventor  
C. P. Buck.  
By Thorpe Gerard  
Attorney

Patented Oct. 6, 1925.

1,556,072

UNITED STATES PATENT OFFICE.

CHARLES P. BUCK, OF TOPEKA, KANSAS.

AUTOMATIC VACUUM CONTROL APPARATUS.

Application filed July 18, 1921. Serial No. 485,779.

*To all whom it may concern:*

Be it known that I, CHARLES P. BUCK, a citizen of the United States, residing at Topeka, in the county of Shawnee and State of Kansas, have invented a certain new and useful Improvement in Automatic Vacuum Control Apparatus, of which the following is a complete specification.

This invention relates to gas tank vacuum regulating devices, and has for its object to produce devices for equalizing the vacuous condition of gas tanks in an oil field and the load on the vacuum pump connected to such tanks, regardless of the closer proximity of the pump to some of the tanks than to the others.

A further object is to produce a regulating device for the use set forth, which is entirely automatic in action and requires no adjustment to accommodate different vacuous conditions in the tanks, that is, which requires no "field" adjustments.

A still further object is to produce a regulating device of simple, strong, durable and comparatively inexpensive construction, which can be installed quickly and easily and at small expense.

With these objects in view, the invention consists in certain novel and useful features of construction and combinations of parts as hereinafter described and claimed; and in order that it may be fully understood, reference is to be had to the accompanying drawing, in which:—

Figure 1:
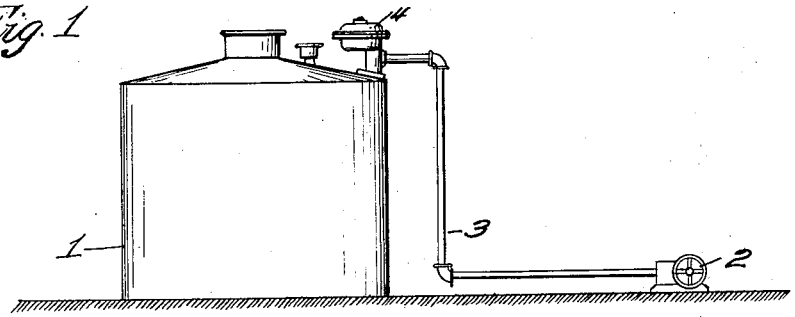
Figure 1 is a diagrammatic view showing a gas tank in a field, connected to a vacuum producing pump and equipped with a regulating device embodying the invention.

In the said drawing, 1 indicates one of a series of storage field tanks for gas as it is drawn from the wells, 2 a vacuum pump for drawing gas from such tanks, and 3 a pipe line between the pump and the series of tanks.

A regulating device 4 is associated with each tank and the said pipe line 3, being provided with a base flange 5 by which it is riveted or otherwise secured with a gas-tight connection with the tank around an opening thereof. The body of the regulating device is provided with a vertical neck portion 6 having an inner cylindrical wall 7 providing a passage 8 connected by ports or perforations 9 in portion 7 with the chamber 10 between the walls 6 and 7, and said chamber communicates through an opening 11 with the pipe line 3.

The body portion of the device is provided with a removable cap or dome 12, and a diaphragm 13 divides the body portion and cap into a lower or vacuum compartment 14, in communication with the passage 8, and an upper or air chamber 15, the latter having an upwardly-projecting portion 16 in communication with the atmosphere. A rain shield 17 covers the portion 16, but is provided with notches or openings 18 whereby air may pass freely under said cap and into said chamber 15 and maintain atmospheric pressure upon the diaphragm.

A cylindrical slide valve 19 fits in the passage 8 for the purpose of cutting off communication at times between said passage and the chamber 10. The spider or bridge 20 of the valve, is equipped with a socket piece 21 having a ball and socket joint connection with a link 22, extending upward into chamber 14, where it is pivotally connected to the adjacent end of a rock-lever 23 fulcrumed on and between bracket arms 24 secured within said portion, the base 25 of the bracket being secured to the bottom of the body portion.

Figure 2:
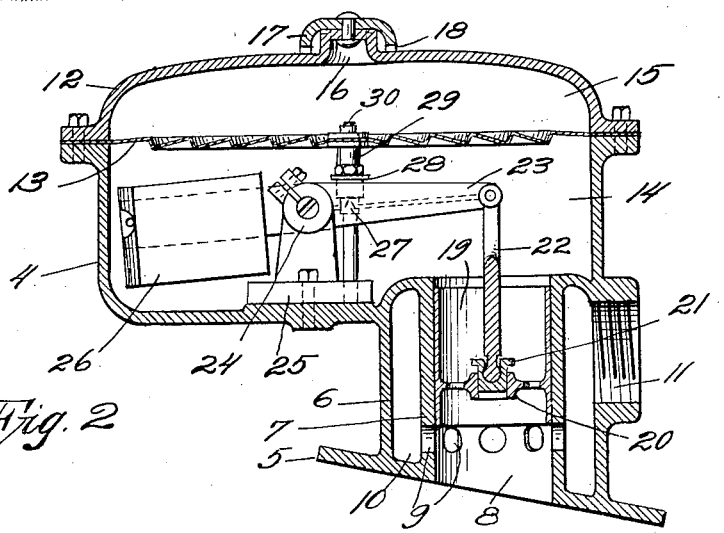
Figure 2 is an enlarged central vertical section of the regulating device.
Figure 3:
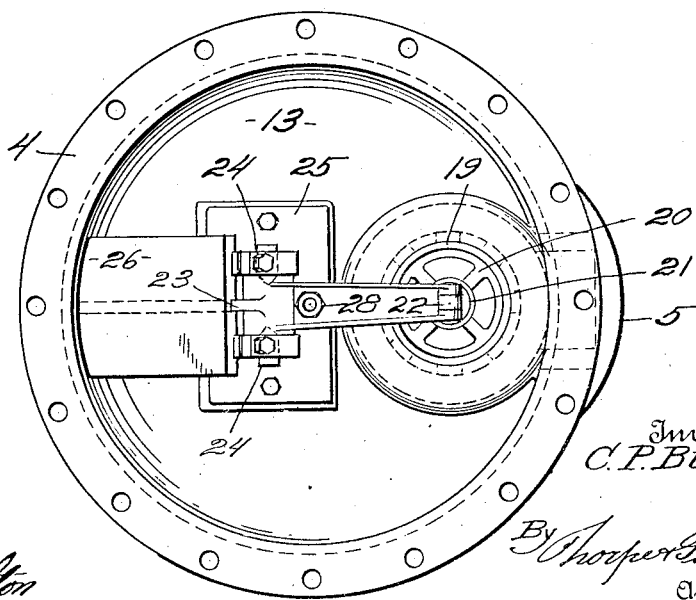
Figure 3 is a top plan view with the cap and diaphragm of the regulating device omitted.

A weight 26 is secured upon the rock-lever and when unresisted holds the valve in open position as shown by Figure 2. The lever has knife edge bearings 27 bearing against the lower end of a sleeve 28 on the stem 29 secured to and depending centrally from the diaphragm and fitting slidingly at its lower end in the case of the bracket.

Assuming that the device is in normal condition and that the same is true of the gas tank, the parts will occupy the position shown by Figure 2. Should the pump increase the vacuous condition of the tank or any particular tank, the air pressure in chamber 15 will impart downward movement to the diaphragm, and the latter, in turn, will apply downward pressure on the rock-lever 23 and thereby elevate weight 26 and impart closing movement to the valve 19, which movement may be sufficient to partially or entirely close the ports or perforations 9 connecting chambers 8 and 10, and in the latter event, completely close communication between the tank and the pump.

Immediately, however, the vacuous condition of the tank returns to normal, the pressure of the air in chamber 15 will be counterbalanced or overcome and the diaphragm will move upwardly to its original position, and as this movement occurs the weight 26 will reverse the movement of the lever 23 and thus re-elevate the valve and re-establish communication between the tank and the pump by way of the ports or perforations 9. It will be seen that this action is entirely automatic and hence will maintain an equalized vacuous condition in all of the tanks connected to a particular pump regardless of the distance which they may be located therefrom.

From the above description it will be apparent that I have produced an equalizing device which embodies the features of advantage set forth as desirable in the statement of the objects of invention, and which obviously may be modified in various particulars without departing from the principle of construction and mode of operation involved or from the scope of the appending claims.

What I claim is:

1. The combination with a gas tank and a pump, of a vacuum regulator casing a diaphragm dividing the casing into two compartments, one open to the atmosphere and the other having a connection communication with said tank, a pipe line communicating with the pump at one end and with said connection at its other end, a rock lever in said last-named compartment and adapted for actuation in one direction by said diaphragm, yielding means for operating said lever in the opposite direction, and a slide valve in said connection and operable by said rock lever to open and close communication between the connection and pipe line, said valve being provided with openings offering constant communication between said last-named compartment and the tank.

2. In combination with a tank having a vapor discharge pipe, a chamber, a diaphragm in said chamber adapted to be actuated in one direction by atmospheric pressure, a passageway provided with lateral ports connecting said tank with said discharge pipe, a rock arm in said chamber, a valve secured to one end of said rock arm and adapted for sliding in said passageway to open and close the lateral ports and having an opening for maintaining communication between the diaphragm chamber and tank, yielding means tending to maintain the valve in open position, and a connection between the diaphragm and rock arm whereby a drop below atmospheric pressure in the vapor space of the tanks will effect the closure of said valve by said diaphragm.

3. In combination with a tank having a vapor discharge pipe, a chamber, a diaphragm in said chamber adapted to be actuated in one direction by atmospheric pressure, a passageway provided with lateral ports connecting said tank with said discharge pipe, a rock arm in said chamber, a link connected to one end of said rock arm, a valve secured to the opposite end of said link and adapted for sliding in said passageway to open and close the lateral ports and having an opening for maintaining communication between the diaphragm chamber and tank, a counterpoise secured to the opposite end of said rock arm from said link and a connection between the diaphragm and rock arm whereby a drop below atmospheric pressure in the vapor space of the tank will effect the closure of said valve by said diaphragm.

4. The combination with a gas tank and a pump, of a vacuum regulator casing a diaphragm dividing the casing into two compartments, one open to the atmosphere and the other having a passageway communicating with said tank, said passageway also having a lateral port, a pipe line communicating with the pump at one end and with the port of said passageway at its other end, an open-ended cylindrical valve slidingly mounted in said passageway, a connection between said diaphragm and valve whereby upon an increase in the vacuous condition in the tank the diaphragm shall close the valve, and yielding means for opening the valve upon an increase in pressure within the tank.

5. The combination with a gas tank and a pump, of a vacuum regulating casing, a diaphragm dividing the casing into two compartments, one open to the atmosphere and the other having a passageway communicating with said tank, the passageway also having a lateral port, a pipe line communicating with the pump at one end and with the lateral port at its other end, a rock arm mounted in one of said diaphragm compartments, a counterweight on one end of said rock arm, an open-ended cylindrical valve secured to the other end of said rock arm and adapted to close said lateral port, and a connection between the rock arm and diaphragm whereby downward movement of the diaphragm against the reactance of the counterweight tends to effect closure of the lateral port of said cylindrical valve.

6. The combination in a vacuum control device of a casing a diaphragm in said casing, a stem fixed at one of its ends to said diaphragm and having sliding engagement at its other end with a portion of said casing, a pivoted rock arm in said casing, a valve operatively connected to said rock arm, and a sleeve on said stem and in abutment with said rock arm for the operation thereof.

7. The combination in a vacuum control device of a casing, a diaphragm in said casing, a pivoted rock arm having a knife edge, a valve operatively connected to said rock arm, a stem secured at one of its ends to said diaphragm and passing through the rock arm and having sliding engagement at its other end with said casing, and a sleeve on said stem interposed between the diaphragm and the rock arm for the operation of the latter.

In witness whereof I hereunto affix my signature.

CHARLES P. BUCK.